(12) United States Patent
Klug et al.

(10) Patent No.: US 11,882,260 B2
(45) Date of Patent: Jan. 23, 2024

(54) CAMERA APPARATUS FOR GENERATING SPATIALLY REPRESENTATIVE IMAGE DATA OF AN ENVIRONMENT

(71) Applicant: AUDI AG, Ingolstadt (DE)

(72) Inventors: Markus Klug, Ingolstadt (DE); Tobias Moll, Ingolstadt (DE); Johannes Scheuchenpflug, Baar-Ebenhausen (DE)

(73) Assignee: AUDI AG, Ingolstadt (DE)

( * ) Notice: Subject to any disclaimer, the term of this patent is extended or adjusted under 35 U.S.C. 154(b) by 63 days.

(21) Appl. No.: 17/617,513

(22) PCT Filed: Aug. 11, 2020

(86) PCT No.: PCT/EP2020/072493
§ 371 (c)(1),
(2) Date: Dec. 8, 2021

(87) PCT Pub. No.: WO2021/037552
PCT Pub. Date: Mar. 4, 2021

(65) Prior Publication Data
US 2022/0256135 A1  Aug. 11, 2022

(30) Foreign Application Priority Data
Aug. 29, 2019 (DE) ..................... 10 2019 212 989.7

(51) Int. Cl.
*H04N 13/214* (2018.01)
*H04N 13/257* (2018.01)
(Continued)

(52) U.S. Cl.
CPC ......... *H04N 13/214* (2018.05); *G02B 6/4206* (2013.01); *H04N 13/211* (2018.05); *H04N 13/257* (2018.05); *H04N 2213/001* (2013.01)

(58) Field of Classification Search
CPC .. G02B 6/0016; G02B 6/4206; H04N 13/211; H04N 13/214; H04N 13/257; H04N 2213/001
(Continued)

(56) References Cited

U.S. PATENT DOCUMENTS

| 4,295,153 A | 10/1981 | Gibson |
| 2005/0052714 A1 | 3/2005 | Klug et al. |

(Continued)

FOREIGN PATENT DOCUMENTS

| CN | 104755994 A | 7/2015 |
| CN | 104932102 A | 9/2015 |

(Continued)

OTHER PUBLICATIONS

International Search Report dated Dec. 10, 2020 for International Application No. PCT/EP2020/072493.
(Continued)

*Primary Examiner* — Christopher S Kelley
*Assistant Examiner* — Ana Picon-Feliciano
(74) *Attorney, Agent, or Firm* — STAAS & HALSEY LLP

(57) ABSTRACT

Cost-effective, spatially representative image data is recording in a stereoscopic or photogrammetric image of an environment by a camera apparatus having three holographic-optical elements arranged as coupling regions at different positions on a carrier medium to capture the environment from different perspectives. Light from the environment is coupled by the coupling regions into the carrier medium which provides a light guide that transfers the light to an additional holographic-optical element which provides a decoupling region to decouple the light from the carrier medium. An image capture device captures the decoupled light and produces image data therefrom. A
(Continued)

separating device produces the spatially representative image data from the image data by capturing the light incident on the coupling regions in a manner separated temporally or by color.

20 Claims, 2 Drawing Sheets

(51) Int. Cl.
*H04N 13/211* (2018.01)
*G02B 6/42* (2006.01)

(58) Field of Classification Search
USPC .......................................................... 348/49
See application file for complete search history.

(56) References Cited

U.S. PATENT DOCUMENTS

| | | | | |
|---|---|---|---|---|
| 2012/0038749 A1* | 2/2012 | Yen | ....................... | H04N 13/211 348/E13.074 |
| 2015/0277014 A1* | 10/2015 | Schrader | .............. | G02B 3/0062 348/335 |
| 2017/0026570 A1* | 1/2017 | Shepard | ................... | G01J 3/12 |
| 2017/0255813 A1 | 9/2017 | Chen et al. | | |
| 2019/0041634 A1* | 2/2019 | Popovich | ................. | G02B 6/00 |
| 2019/0086674 A1* | 3/2019 | Sinay | ................... | G02B 27/283 |

FOREIGN PATENT DOCUMENTS

| | | |
|---|---|---|
| CN | 109416474 A | 3/2019 |
| DE | 2223 381 A1 | 11/1972 |
| DE | 195 37 220 A1 | 4/1997 |
| DE | 10 2015 221 774 A1 | 5/2017 |
| DE | 10 2017 005 056 A1 | 11/2017 |

OTHER PUBLICATIONS

Office Action dated Jul. 22, 2020 from German Application No. 10 2019 212 989.7.
Office Action dated Sep. 30, 2020 from German Application No. 10 2019 212 989.7.
Translation by WIPO of International Preliminary Report on Patentability for International Appl. No. PCT/EP2020/072493 dated Aug. 17, 2021.
PCT/EP2020/072493, Aug. 11, 2020, Markus Klug, Audi AG.
10 2019 212 989.7, Aug. 29, 2019, Markus Klug, Audi AG.
Chinese Office Action dated Aug. 30, 2023 from parallel Chinese Application No. 202080042792.2.

* cited by examiner

CAMERA APPARATUS FOR GENERATING SPATIALLY REPRESENTATIVE IMAGE DATA OF AN ENVIRONMENT

CROSS REFERENCE TO RELATED APPLICATIONS

This application is a U.S. national stage of International Application No. PCT/EP2020/072493, filed on Aug. 11, 2020. The International Application claims the priority benefit of German Application No. 10 2019 212 989.7 filed on Aug. 29, 2019. Both the International Application and the German Application are incorporated by reference herein in their entirety.

BACKGROUND

Described below is a camera apparatus for generating spatially representative image data of an environment. This involves the correct acquisition or recording of separate image data or individual image data of the environment, from which the spatially representative image data and thus, for example, a stereoscopic or photogrammetric image of the environment can subsequently be generated.

The acquisition or generation of a stereoscopic image is also known as stereoscopy. For this purpose, in general at least two individual image data sets having photographs from different perspectives are generated of a desired detail of the environment. Two two-dimensional recordings, which each show the environmental detail from a different perspective, can thus be provided by these data sets. Upon the visual superposition of the two individual image data sets, the spatially representative image data result. The resulting stereoscopic image thus shows the superposition of the two two-dimensional recordings. By using special glasses, so-called 3D glasses, an observer can perceive the stereoscopic image as a three-dimensional image.

The generation or recording of a photogrammetric image or picture of the surroundings, also called photogrammetry, is a known method in which a spatial position or three-dimensional shape of an environment, in particular an object in the environment, is determined. For this purpose, similarly to stereoscopy, at least two individual image data sets of the environment are likewise usually generated from different perspectives. Upon superposition of these image data, each image point or each pixel of the resulting spatially representative image data has, in addition to an x and y orientation in two-dimensional space, an item of depth information. A three-dimensional image of the environment can thus be displayed. The term three-dimensional (3D) is therefore also used as a synonym for the term photogrammetric hereinafter.

That is to say, the spatially representative image data provide, in particular for an observer of the resulting image, an item of depth information or a spatial or three-dimensional impression of the imaged environment.

Special cameras or measurement cameras are generally used to generate the spatially representative image data. These measurement cameras are set up at different positions located remotely from one another and thus each have a different perspective, thus a viewing direction of the desired object in the environment dependent on the respective position. Using the measurement cameras, the desired object can now be recorded from the different perspectives, in particular simultaneously, and subsequently combined to form the spatially representative image data. In particular in the case of a moving scene, thus a moving object, this method is very expensive, especially with respect to the resulting costs. Furthermore, the resulting image would be blurry or distorted. Moreover, in general a large amount of room or space is required for the construction or the arrangement of the measurement cameras in relation to one another, since a stereo width or depth information, that is to say an image depth of the resulting image is determined via a distance of the individual measurement cameras and is related to a distance to the desired object.

A less expensive method for recording the spatially representative image data is to use a single measurement camera. Images of the desired object in the environment are then recorded using this single measurement camera from different positions, thus from different perspectives. The stereoscopic or photogrammetric image of the object is subsequently generated from the individual images. However, the disadvantage results in this case that the method is slow due to the displacement of the measurement camera and repetition accuracy generally suffers. This is because the scene, thus the object, has to remain the same for the various recordings, that is to say it has to be unmoving.

An optical system is known in conjunction with stereoscopic or photogrammetric images from DE 10 2015 221 774 A1, in which a hologram set is used to generate a two-dimensional or three-dimensional image.

Moreover, a representation of an environment by holographic stereograms is known from US 2005/0052714 A1.

The cited prior art relates, however, more to the representation of the image for an observer instead of the correct acquisition of spatially representative image data to generate the stereoscopic or photogrammetric image therefrom.

Moreover, a method and an apparatus for measuring parallaxes in photogrammetric stereo devices is known from DE 2 223 381 A1. This relates more to measuring and evaluating stereoimages for height calculation, however.

SUMMARY

Described herein is a camera apparatus, by which costs can be saved when generating spatially representative image data of an environment and in particular moving scenes, thus moving objects in the environment can be recorded.

Described herein is a camera apparatus for generating spatially representative image data of an environment. For example, a stereoscopic or photogrammetric image of the environment can be provided by these data. In other words, this involves stereoscopic or photogrammetric evaluation of the environment by the camera apparatus. The spatially representative image data, also called 3D image data hereinafter, can be provided in particular by combining individual image data or individual image data sets which are generated upon recording the environment from different perspectives. The 3D image can be described, for example, by pixels having depth information (distance to the image sensor). To save costs when generating or providing the stereoscopic or photogrammetric image, it is provided that the different individual image data, thus the different images from the various perspectives, are only acquired by one camera, thus one image acquisition device, and thus in particular by the same image sensor. To be able to record a moving scene, thus a moving object in the environment in addition, the camera in particular has multiple acquisition regions spatially offset from one another, in the present case also called coupling regions, for the light or the optical radiation of the environment. These acquisition regions or light acquisition regions deflect the light from the environment, thus the light which is emitted by a desired object or object to be imaged into the environment, onto a light incidence region, which is provided, for example, by a surface of a terminating lens or imaging optical unit of the image acquisition device.

To induce this light deflection, the camera apparatus includes a carrier medium or light guiding medium, for example, a glass plate or glass pane, which is designed as a light guide. That is to say, the carrier medium can relay light by internal reflection, in particular by total reflection, in particular similarly to a glass fiber cable. A coupling region and a decoupling region are arranged on the carrier medium. The carrier medium so to speak carries the coupling region and the decoupling region. Both the coupling region and also the decoupling region each have a deflection structure by which light from the environment can be coupled into or decoupled from the carrier medium, respectively. The coupling region thus represents one of the light acquisition regions for the image acquisition device. In contrast, the decoupling region can be used as an interface for transmitting light to the light incidence region of the camera.

The coupling region has the mentioned deflection structure for coupling in the light. This can be designed, for example, in the form of an optical grating, also called a diffraction grating. The deflection structure is designed to couple light which is incident from the environment on the coupling region into the carrier medium. In this context, coupling means that the deflection structure deflects or redirects the light from the environment in such a way that it penetrates into a volume of the carrier medium and is internally reflected there on at least one interface of the carrier medium. The carrier medium is designed to transmit the light coupled in via the coupling region by internal reflection to the decoupling region. If the transmitted light is now incident on the decoupling region, the deflection structure of the decoupling region can finally decouple the transmitted light out of the carrier medium. That is to say, the decoupling deflection structure can divert or deflect the transmitted or relayed light in particular in such a way that the light is no longer reflected at the interface of the carrier medium upon incidence on the deflection structure, but rather is decoupled out of the carrier medium and can thus exit from the carrier medium.

The image acquisition device is applied to the decoupling region. This may be a separate imaging optical unit by which incident light is imaged on at least one image sensor. Furthermore, the image acquisition device may also include an evaluation electronics unit, thus, for example, at least one processing unit, which can be designed, for example, as a controller or microcontroller. The evaluation electronics unit may be coupled to the at least one image sensor and can generate image data from electrical signals of the image sensor which are generated upon incidence of light. The image acquisition device is thus designed for the purpose of acquiring the light decoupled from the carrier medium and generating image data therefrom, which are correlated with the light of the environment incident on the coupling region. Therefore, upon evaluation of the image data, that is to say upon reconstruction of the image data to form an image, in particular a sharp, undistorted image of the environment or of the object to be imaged in the environment is provided. The decoupling region may abut the image acquisition device in such a way that the decoupling region overlaps, in particular completely, with the light incidence region of the image acquisition device.

Up to this point, it has been described how image data of an individual image, thus the mentioned individual image data of the environment are generated from a single perspective.

To be able to generate the three-dimensional or stereoscopic image of the environment, the camera apparatus has at least one further coupling region for the light from the environment. The at least one further coupling region can thus represent a further light acquisition region for the camera apparatus. The camera apparatus thus has at least two light acquisition regions, that is to say, two or more light acquisition regions. The at least one further coupling region may be arranged spatially separated from the first coupling region or in a different section than the first coupling region on the carrier medium. The environment can thus be acquired from different perspectives using the different coupling regions, which are arranged at different positions on the carrier medium. In the following, the at least one further coupling region can also be referred to in short as a further coupling region, however this nonetheless means that more than only one further coupling region, for example, two or four further coupling regions can also be arranged on the carrier medium.

Corresponding to the first coupling region, the at least one further coupling region also has a further deflection structure in each case, for example, an optical grating, which is designed to couple light which is incident from the environment on the respective further coupling region into the carrier medium. As described above in reference to the first coupling region, the carrier medium is also designed to transmit the light coupled in via the further coupling region by internal reflection to the decoupling region, that is to say to the same decoupling region as was already described in conjunction with the first coupling region. Moreover, the decoupling deflection structure of the decoupling region is designed to decouple the transmitted light of the further coupling region, which is incident on the decoupling region, out of the carrier medium. Finally, the image acquisition device is also designed to acquire the light of the respective further coupling region decoupled from the carrier medium and to generate therefrom respective further image data, in particular further individual image data, which are correlated with the light of the environment incident on the respective further coupling region. Therefore, using only one image acquisition device or camera, light from the environment can be acquired by more than one coupling region, thus by at least two coupling regions, for example, simultaneously or in succession. Subsequently, the image acquisition device can generate or create different image data or individual image data from the light incident from the different coupling regions. In particular, the light of the different acquisition regions is projected by the decoupling region on the same area of the image sensor in the image acquisition device. A separate area thus does not have to be provided per acquisition region.

To generate or provide the stereoscopic or photogrammetric image of the environment, the image acquisition device can combine or reconstruct the different individual image data and thus generate the spatially representative image data. A respective position of the different coupling regions on the carrier medium may be known to the image acquisition device for this purpose. That is to say, the image acquisition device is furthermore designed to generate the stereoscopic image from the different image data which are correlated with the light from the environment which is incident on the different coupling regions. However, it is advantageous here if the information about which of the different coupling regions the light from the environment was transmitted or relayed from is stored in the image acquisition device. That is to say, the image acquisition device is to be able to acquire the light incident on the different coupling regions separately.

This is because if light were incident from the environment simultaneously on the image acquisition device, in particular the at least one image sensor of the image acquisition device, the incident light of the different coupling regions would be superimposed on the image sensor. An intensity superposition of the light intensities of the incident light of the different coupling regions would thus occur. It is therefore advantageous if the incident light of the different coupling regions is acquired separately and therefore also the different image data, thus the individual image data, are initially generated separately and only subsequently superimposed to form the spatially representative image data. To separate the light incident via the different coupling regions, the camera apparatus therefore additionally has a separating device, which is designed to separate the light incident on the different coupling regions. The separation of the incident light of the different coupling regions can in particular take place in succession chronologically, that is to say viewed with respect to time, thus chronologically sequentially or in a frequency-selective manner, that is to say separated according to colors.

To generate the spatially representative image data, it can be provided in particular that the image acquisition device processes the different image data or individual image data stereoscopically or photogrammetrically. In stereoscopic processing, the image acquisition device can use, for example, the mentioned anaglyph methods, in which images of the environment acquired using the different coupling regions are colored in complementary colors and subsequently printed one on top of another. Using corresponding special glasses, so-called 3D glasses, an observer of the resulting stereoscopic image can subsequently perceive a three-dimensional image of the environment. Alternatively, for example, a lenticular image can also be created by the image acquisition device.

As mentioned above, the respective deflection structure of the decoupling region and the different coupling regions can be formed as an optical grating. In one embodiment, it is therefore provided that the respective deflection structure is provided as at least one optical grating, in particular a surface holographic grating or a volume holographic grating. In this context, the camera apparatus is referred to here as a holocam.

An optical grating, also called a diffraction grating, and its mode of operation and production method, is generally known. In principle, an optical grating can be formed as structures that are periodic at least in sections, so-called grating structures, in a substrate. In the grating structure, an optical grating can induce light guiding, as is known, for example, of mirrors, lenses, or prisms, by the physical effect of diffraction. If light is incident, that is to say light beams are incident on the optical grating, wherein the incident light beams meet the Bragg equation in particular, the light beams are thus diffracted or deflected by the optical grating. The light guiding can thus take place in particular by appearances of interference of the light beams diffracted by the optical grating. The deflection structure of the coupling region or decoupling region can accordingly also be referred to as a diffraction structure.

An optical grating may be direction-selective or angle-selective with respect to the incident light. Therefore, only light, in particular a component of the light which is incident from a predetermined direction of incidence, for example, at a predetermined angle, on an optical grating can be deflected. Light, in particular a component of the light which is incident from another direction on the optical grating may not be deflected or may be deflected less the greater the difference is to the predetermined direction of incidence. The light component which deviates from the predetermined direction of incidence or optimum direction of incidence can therefore propagate unobstructed through the substrate having the optical grating.

Additionally or alternatively, an optical grating can also be made wavelength-selective or frequency-selective. Therefore, only light, in particular a first component of the light having a predetermined wavelength, can be deflected or diffracted by the optical grating at a specific diffraction angle. Light, in particular a second component of the light having a wavelength other than the predetermined wavelength may not be deflected, or may be deflected less the greater the difference is to the predetermined wavelength. The second light component, which deviates from the predetermined wavelength or optimal wavelength, can therefore propagate unobstructed through the substrate having the optical grating. Thus, for example, at least one monochromatic light component can be split off from polychromatic light which is incident on the optical grating. The deflection effect is advantageously maximal for the optimal wavelength and decreases toward longer and shorter wavelengths, for example, according to a Gaussian bell, or becomes weaker. In particular, the deflection effect only acts on a fraction of the visible light spectrum and/or in an angle range less than 90°.

Optical gratings can in particular be produced by exposure of a substrate, thus, for example, by photolithography or holography. In this context, the optical grating can then also be referred to as a holographic or holographic optical grating. Two types of holographic optical gratings are known: surface holographic gratings (SHG) and volume holographic gratings (VHG). In the case of surface holographic gratings, the grating structure can be created by optical deformation of a surface structure of the substrate. Incident light can be deflected, for example reflected, by the changed surface structure. Examples of surface holographic gratings are so-called sawtooth or blazed gratings. In contrast thereto, the grating structure in volume holographic gratings can be incorporated into the entire volume or a subsection of the volume of the substrate. Surface holographic gratings and volume holographic gratings are generally frequency-selective. However, optical gratings are also known which can diffract polychromatic light. These are referred to as multiplexed volume holographic gratings (MVHG) and can be produced, for example, by changing the periodicity of the grating structure of an optical grating or increasing a number of grating planes of the optical grating or by arranging multiple volume holographic gratings in succession.

Particularly glass, for example quartz glass, in particular a photosensitive glass is suitable as a material for the substrate for incorporating an optical grating. Alternatively, a polymer, in particular a photopolymer, or a film, in particular a photosensitive film, for example made of plastic or organic materials, can also be used. For the use of such substrates for the camera apparatus, it is additionally to be ensured that the material, in particular in substrate form, has lightwave-conducting properties. Substrates which have a deflection structure for refracting light, for example, in the form of an optical grating, can also be referred to as holographic optical elements (HOE). Using such HOEs, in particular the properties of conventional lenses, mirrors, and prisms can be simulated. Advantages of HOEs are that, in contrast to the conventional optical elements manufactured from glass or plastic, they can be made lighter, substantially flatter due to not requiring a curvature, and transparent at the same time.

The carrier medium itself can be formed as an HOE. That is to say, the coupling region and the decoupling region can be formed in one piece with the carrier medium itself and can thus be incorporated, for example, directly into a surface structure of the carrier medium. That is to say, the respective deflection structure can be etched or lasered into the surface of the carrier medium, for example.

Alternatively, it can be provided that the carrier medium is formed as a separate element to the coupling region and the decoupling region. That is to say, coupling region, decoupling region, and carrier medium can be formed separately. For example, the coupling region and the decoupling region can form at least one first element and the carrier medium can form a second element, against which the first element abuts. The coupling region and the decoupling region can therefore be formed in at least one HOE. For example, the coupling region and the decoupling region can be formed in different sections of a holographic film or plate. The film or plate can be adhesively bonded on the carrier medium to fasten the film or plate on the carrier medium. Alternatively, the holographic film can also be formed as an adhesion film and can adhere directly, thus without adhesive, due to molecular forces on the surface of the carrier medium.

Possible embodiments of the separating device are described in more detail hereinafter.

The separate acquisition of the incident light could be implemented, for example, in that more than one image sensor is used. That is to say, for each of the different coupling regions, a separate image sensor would be provided to acquire the light relayed by the respective coupling region. The decoupling region could then be made direction-selective, for example, and also deflect the light transmitted from the different coupling regions from different directions in dependence on the direction of incidence onto the image sensors assigned to or associated with the respective coupling region. However, the image acquisition device and thus also the camera apparatus would thus have an increased installation space requirement, since a separate image sensor would also have to be installed for each coupling region. It is therefore provided in one embodiment that the image acquisition device only uses one image sensor to acquire the decoupled light. That is to say, the light from the environment which is incident on the different coupling regions is redirected or transmitted onto a single image sensor. For this purpose, the decoupling region, in particular the decoupling deflection structure, can be designed to always deflect the light transmitted from the different coupling regions in the same direction in dependence on the direction of incidence on the decoupling region. For example, the decoupling deflection structure can be provided as an optical grating having multiple different grating planes, which are each made direction-selective, for each one of the different coupling regions. In this embodiment having only one image sensor, it can either be provided that the light incident on the different coupling regions is superimposed on the image sensor or that the light incident on the different coupling regions is incident on the same surface region of the image sensor in succession, in particular in chronological succession.

In order that the above-described intensity superposition is avoided upon the superposition of the light incident on the different coupling regions upon striking the image sensor, in one embodiment, it can be provided that the light which is incident from the environment on the different coupling regions is already filtered according to color upon the coupling into the carrier medium. That is to say, the separating device is designed to separate the light incident on the different coupling regions in a frequency-selective or wavelength-selective manner. In other words, the light which is incident from the environment on the different coupling regions can already be pre-filtered according to color by the coupling regions or the coupling deflection structures.

Moreover, it is provided in one embodiment that the image sensor is designed as a color sensor. That is to say, the image sensor can be designed, for example, as a Bayer sensor, wherein a color filter or a Bayer filter is connected upstream of the image sensor. Such a color filter generally has individual color sensor elements which are arranged together in a matrix, wherein each color sensor element filters the light for one pixel of the image sensor. The color sensor elements are frequency-selective here, that is to say only light of a predetermined wavelength can be transmitted onto the image sensor via each of the color sensor elements. For example, the color sensor elements can be divided into categories, wherein a first category of the color sensor elements is only transmissive for red light, a second category of the color sensor elements is only transmissive for blue light, and a third category of the color sensor elements is only transmissive for green light.

To implement the pre-filtering of the incident light already at the different coupling regions, in a further embodiment, the respective deflection structure of the different coupling regions itself is made frequency-selective. That is to say, the respective deflection structure only deflects light of a predetermined wavelength, so that it is coupled into the carrier medium. Such a frequency selectivity or wavelength selectivity is a typical property of holographic optical elements which use optical gratings as deflection structures for the light deflection. If white light from the environment is incident on one of the respective coupling regions, for example, only the light component of the light, thus a first component of the light having the predetermined wavelength can be deflected or diffracted by the respective deflection structure at a specific angle of diffraction. Light, in particular the remaining component or second component of the light having a wavelength other than the predetermined wavelength may not be deflected, or may be deflected less the greater the difference is to the predetermined wavelength. The second component of the light which deviates from the predetermined wavelength or optimal wavelength can therefore in particular propagate unobstructed through the carrier medium. In particular a monochromatic light component can thus be split off from the polychromatic light which is incident on the respective deflection structure. The deflection effect is advantageously maximal for the optimal wavelength and decreases toward longer and shorter wavelengths, for example, according to a Gaussian curve, or becomes weaker. The predetermined wavelengths which the respective deflection structures deflect differ from one another. That is to say, each of the deflection structures deflects light of a different wavelength. A first of the different coupling regions can thus be formed as a red filter, for example, and can only deflect red light. In contrast, a second of the different coupling regions can be formed as a blue filter, for example, and thus can only deflect blue light. Finally, a third of the different coupling regions can be formed as a green filter, for example, and thus only deflect green light.

Alternatively, the prefiltering can also be implemented in that each of the different coupling regions itself has a color filter connected upstream, for example made of colored glass, plastic, or gelatin films. Such a color filter can let light pass of a specific color, thus a specific wavelength.

In a further embodiment, it can additionally be provided that the frequency selectivity of the coupling regions corresponds to the frequency selectivity of the color image sensor. In other words, a plurality of color sensor elements of the color image sensor can be provided for each of the coupling regions, which are selective with respect to the same wavelength, thus filter the same wavelength as the respective coupling region. The predetermined wavelength which the respective deflection structure of the different coupling regions deflects therefore corresponds to a respective color filter wavelength of the color image sensor. That is to say, the predetermined wavelength which deflects the first of the different wavelength ranges corresponds to the wavelength for which a first category of color sensor elements of the color image sensor is transmissive. Similarly, the predetermined wavelength which the second of the different coupling regions deflects also corresponds to the wavelength for which a second category of the color sensor elements of the color image sensor is transmissive and so on.

Therefore, only one image sensor is necessary to generate the spatially representative image data and thus the three-dimensional or the stereoscopic image of the environment. Although the light which is incident on the different coupling regions is superimposed, nonetheless, due to the separation of the light according to colors, thus the frequency-selective separation by the different coupling regions and the color image sensor, separate or separated image data, thus the mentioned individual image data of the different coupling regions can be generated by the image acquisition device.

Alternatively to the color-selective or frequency-selective separation of the light, as mentioned above, a chronological separation of the light incident on the different coupling regions can also be provided, so that the image acquisition device can separately acquire the incident light on the different coupling regions and thus can generate the photogrammetric or stereoscopic image of the environment. In other words, the separating device is designed to separate the light incident on the different coupling regions chronologically. That is to say, it can be provided similarly as in a time multiplex method that multiple data of different sensors, thus the incident light of the different coupling regions, are transmitted in succession with respect to time via a shared line, that is to say via the carrier medium, to a receiver, thus the image acquisition device and in particular the image sensor of the image acquisition device.

For the chronological separation of the light redirected onto the image acquisition device from the different coupling regions, it can be provided in a further embodiment that the different coupling regions are made switchable. That is to say, each of the different coupling regions can have various switching states. In a first switching state, the respective coupling region can be designed in particular to deflect the light which is incident from the environment on the respective coupling region as described above, so that it is coupled into the carrier medium. In a second switching state different from the first switching state, it can be provided that the coupling region can be made completely light-transmissive or light-opaque, so that coupling into the carrier medium is avoided.

For this purpose, the camera apparatus can have, for example, a switching device which is designed to switch the different coupling regions in dependence on a control signal. The switching device may switch the different coupling regions offset in time with respect to one another, thus in chronological succession. It is therefore possible to change between a switched-on switching state and a switched-off switching state of the different coupling regions by the switching device. Switched-on switching state means here that the coupling regions deflect the incident light so that it is coupled into the carrier medium, whereas in the switched-off state, the coupling of the incident light is avoided. To switch the coupling regions, the switching device can be designed, for example, to provide an electrical or magnetic field or a temperature at the coupling region to be switched. That is to say, to set the switched-on state, for example, a first value of the electrical or magnetic field or the temperature can be set and to set the switched-off switching state, for example, a second value of the electrical or magnetic field or the temperature can be set. For this purpose, the switching device may include, for example, at least one electrical capacitor and/or at least one electrical inductance and/or at least one heating element, such as a heating wire, which is designed to provide the electrical or magnetic field or the temperature by a controller or microcontroller.

The different coupling regions can in particular be made self-deflecting or self-blocking. In this context, self-deflecting means that the different coupling regions are in the switched-on switching state in the idle state, thus without activation by the switching device. They can thus first be put into the switched-off switching state by activation, and thus application of the electrical or magnetic field or provision of the temperature. Self-blocking, in contrast, means that the different coupling regions are in the switched-off switching state in the idle state, thus without activation by the switching device. They can thus first be put into the switched-on switching state by activation, thus application of the electrical or magnetic field or provision of the temperature.

A deflection characteristic of the respective coupling region is thus changed by changing between the two switching states. In other words, in this embodiment the different coupling regions are made switchable, whereby the deflection characteristic of the different coupling regions is changeable.

The coupling regions may be switched offset in time in such a way that always only one of the different coupling regions is active. That is to say, only one of the different coupling regions is active, is thus in the switched-on switching state and can therefore couple light from the environment into the carrier medium. The others of the coupling regions are inactive during this, are thus in the switched-off switching state, whereby the coupling of the light into the carrier medium is avoided.

A readout rate of the image data from the image sensor is advantageously synchronized with the switching of the different coupling regions. It is thus known to the image acquisition device from which of the coupling regions the image data originate, thus from which perspective the environment was acquired. Since the distribution of the different coupling regions on the carrier medium is known, the scene or the environment can thus be constructed three-dimensionally, i.e., photogrammetrically, or stereoscopically.

To make the different coupling regions switchable, in a further embodiment a switchable darkening layer can be provided. For example, a liquid crystal layer or a liquid crystal arrangement can be used as a darkening layer, in which the alignment of the liquid crystals changes in dependence on an electrical voltage, i.e., in dependence on an electrical field. The transmissibility of the liquid crystal arrangement can thus be changed by changing the alignment. Alternatively, an electrochromic glass layer, also called intelligent glass, can also be used as the darkening layer. Such a glass layer can change its light transmissivity by applying an electrical voltage or by heating, thus by applying a temperature. The electrochromic glass layer is thus designed to change between a transparent or light transmissive state and an opaque state depending on a switching signal of the abovementioned switching device. In other words, in this embodiment a switchable darkening layer is provided, so that the respective deflection characteristic of the different coupling regions changes in dependence on a switching signal of the darkening layer.

In an alternative embodiment, it can also be provided that the respective deflection structure itself is made switchable. For this purpose, the respective deflection structure can be designed as an optical grating, in particular a holographic optical grating. Switchable optical gratings, in particular the mode of operation and production methods thereof, are generally known. The respective deflection structure may change its deflection characteristic, for example, in dependence on an electrical voltage as a switching signal. In other words, it is provided in this embodiment that the respective deflection structure itself is made switchable, so that the respective deflection characteristic of the associated coupling region changes in dependence on a switching state of the respective deflection structure.

In one embodiment, at least three different coupling regions are provided. The at least three coupling regions may be arranged on the carrier medium, so that the environment or the object in the environment can be acquired from three different perspectives. A photogrammetric or stereoscopic image of the environment having particularly good depth of field can thus be generated particularly well.

BRIEF DESCRIPTION OF THE DRAWINGS

In the following, other aspects and advantages will become more apparent and more readily appreciated from the following description of exemplary embodiments, taken in conjunction with the accompanying drawings of which.

DETAILED DESCRIPTION

In the exemplary embodiments, the described components of the embodiments each represent individual features to be considered independently of one another, which each also refine the invention independently of one another. Therefore, combinations of the features of the embodiments other than those shown are included. Furthermore, the described embodiments can also be supplemented by further features already described.

In the figures, identical reference signs each identify functionally identical elements.

Figure 1:
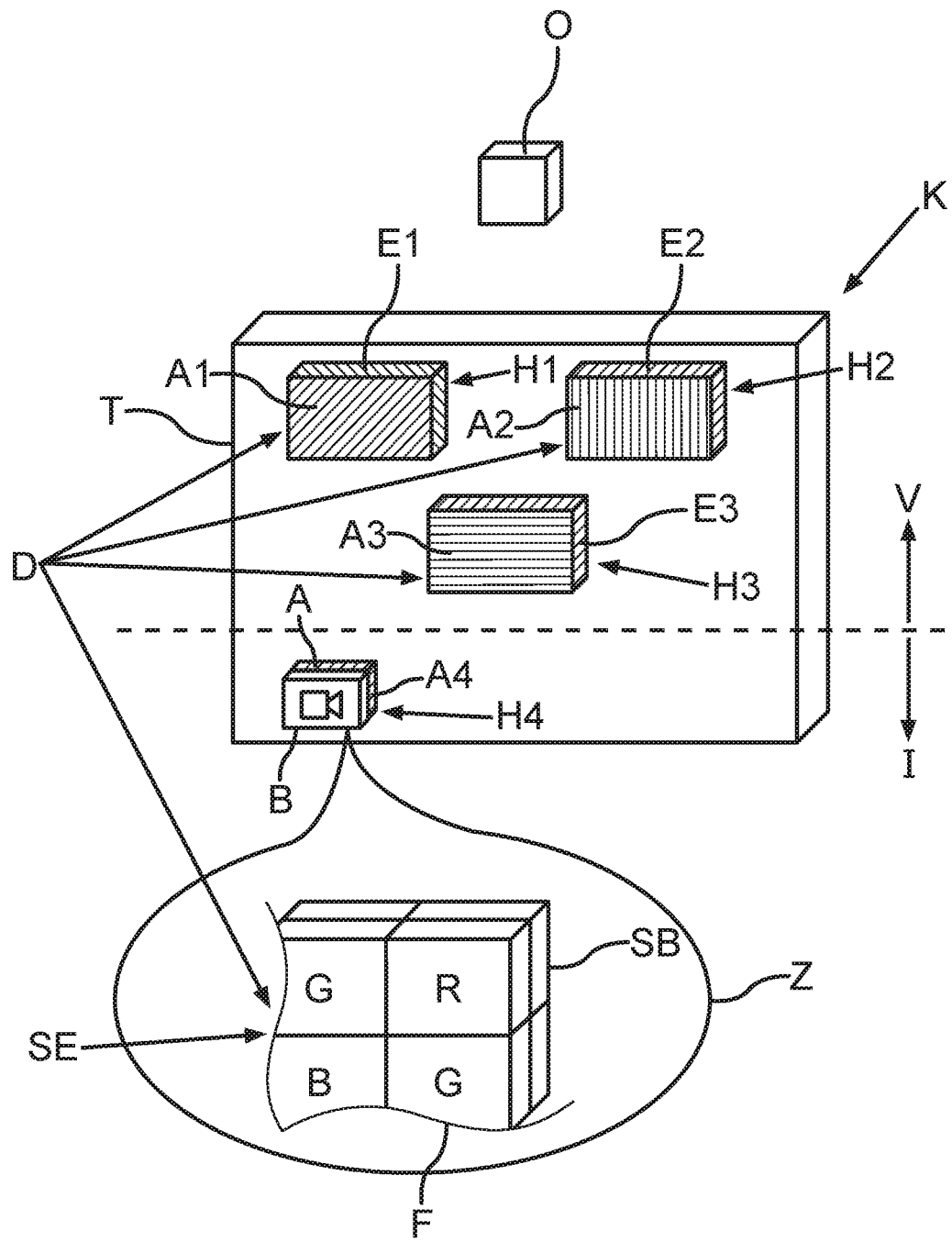
FIG. 1 is a schematic perspective view of a camera apparatus for generating a stereoscopic or photogrammetric image of an object in the environment of the camera apparatus.
Figure 2:
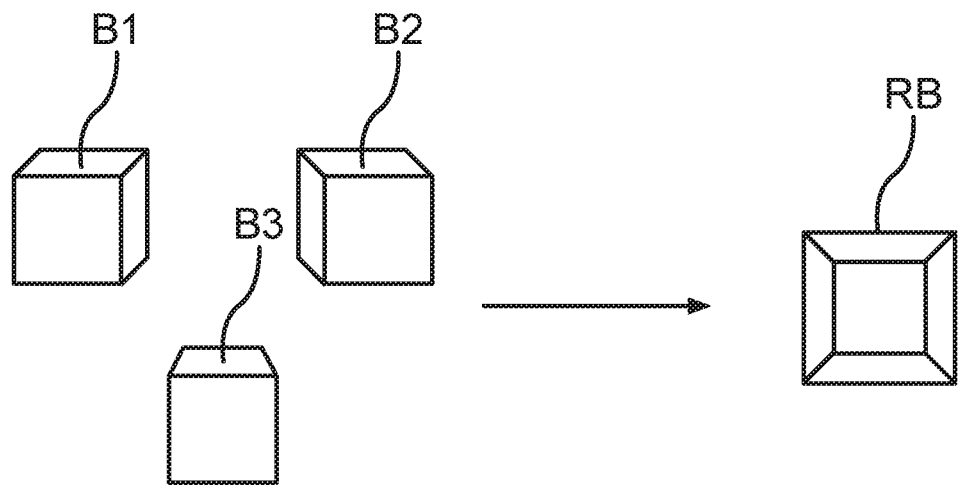
FIG. 2 is a schematic illustration of different image data which represent the object from different perspectives and a reconstruction of the image data to form the photogrammetric image of the object.

FIG. 1 shows a camera apparatus K for generating spatially representative image data, by which a stereoscopic or photogrammetric image RB of an environment can be provided. When generating or recording such a stereoscopic or photogrammetric picture or image RB, the environment or a desired object O in the environment is generally acquired from different perspectives. Therefore, different image data or individual image data B1, B2, B3 are generated from each perspective, which each represent or depict a different image or individual image of the environment. As shown in FIG. 2, the individual image data B1, B2, B3 can subsequently be combined to form the spatially representative image data, by which then, for example, the three-dimensional or photogrammetric image RB shown can be represented. Due to the combination or superposition of the individual image data B1, B2, B3, the photogrammetric image RB thus has in addition an item of depth information for each individual pixel in addition to an x and y orientation, thus an item of two-dimensional information.

To save costs in the production of the camera apparatus K for generating the photogrammetric image RB, it is advantageous to use only one image acquisition device B, which is designed, for example, as a camera, in particular as a photo camera or video camera having an imaging optical unit. To additionally also be able to acquire moving scenes, that is to say, for example, a moving object O, without having to change a position of the camera apparatus K, it is furthermore advantageous if the camera apparatus K has multiple acquisition regions, using which the object O can be acquired from different perspectives. The acquisition regions or coupling regions E1, E2, E3 are offset in relation to one another, thus arranged or attached spatially separated from one another on a carrier medium T formed as a light guide, for example, a glass plate, and transmit the light from the environment to the common image acquisition device B. It has proven to be particularly advantageous to form these coupling regions E1, E2, E3 as holographic optical elements H1, H2, H3, abbreviated hereinafter with HOE.

HOEs are known as optical components which use the physical effect of diffraction to induce different variants of the light guiding. An HOE generally has a photosensitive substrate for this purpose, for example, a glass plate or film made of plastic, in which a grating structure is incorporated by a discrete exposure pattern. An optical function can be applied in particular to the HOE by exposure. An optical grating can be provided by the grating structure, at which light which is incident on the optical grating is diffracted or deflected in consideration of appearances of interference. HOEs can in particular be made direction-selective and frequency-selective in relation to the incident light. That is to say, they may only deflect light having an angle of incidence determined by the grating structure and a wavelength determined by the grating structure.

Figure 3:
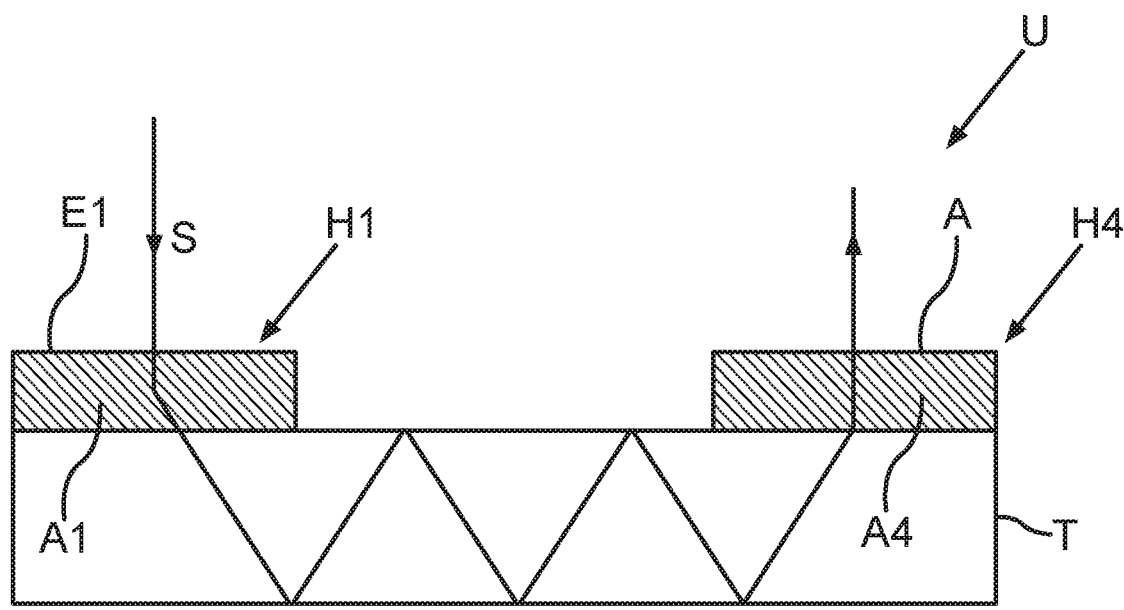
FIG. 3 is a schematic cross section of a deflection unit, on the basis of which light guiding by a holographic optical element is explained.

In FIG. 1, such HOEs H1, H2, H3 are used as the coupling regions E1, E2, E3, to acquire light which is incident from the object O on the different coupling regions E1, E2, E3 from three different perspectives and to transmit it via a further HOE H4, which represents a decoupling region A, to the image acquisition device B. In the following, initially the light guiding by an HOE will be described. FIG. 3 shows for this purpose a deflection unit U having a carrier medium T, which can be formed, for example, as a glass plate or polymer plate, and on which, viewed along a longitudinal extension direction, a coupling HOE H1 and a decoupling HOE H4 are arranged in succession. In the deflection unit U, light L, in particular an optical beam path of the light S, can be redirected and thus an optical axis of the light S can be shifted. The light S is coupled for this purpose using the coupling HOE H1 into the carrier medium T and relayed by the carrier medium by internal reflection, in particular total reflection, to the HOE H4. The coupling HOE H1 thus represents in particular a coupling region E1 for the light S from the environment into the carrier medium T, whereas the decoupling HOE H4 represents a decoupling region A for the light S out of the carrier medium T.

To enable the light guiding, the HOE H1 has a coupling deflection structure A1 and the HOE H2 has a decoupling deflection structure A4. The respective deflection structure can be formed in particular as at least one of the above-described optical gratings. The coupling deflection structure A1 can therefore be designed to couple the light S, which is incident from the environment on the coupling HOE H1, into the carrier medium T and to redirect it by diffraction at the grating structure of the optical grating. The coupled-in light S is then reflected by internal reflection, in particular total reflection, at the interfaces of the carrier medium T aligned to the environment and thus transmitted from the coupling region E to the decoupling region A. The carrier medium T and the HOEs H1, H4 may have the same index of refraction, so that a light refraction is avoided at the interfaces between the HOEs H1, H4 and the carrier medium T. The decoupling deflection structure A4, in contrast, can be designed to decouple the transmitted light S, which is incident on the decoupling HOE H4, out of the carrier medium T. The HOEs H1, H4 are formed, for example, as volume holograms in FIG. 3. That is to say, the respective deflection structure can be incorporated as a volume holographic grating into the substrate of the respective HOE H1, H4.

However, this design of the deflection unit U only represents an exemplary embodiment. Alternatively, the coupling region E1 and the decoupling region A can also be formed in a common HOE. Furthermore, it can be provided that the carrier medium T itself forms the HOE. The coupling region E1 and the decoupling region A can be incorporated here in particular into a surface of the carrier medium T. The carrier medium T can thus have a surface holographic grating in each case as coupling region E1 and decoupling region A.

The camera apparatus K in FIG. 1 uses the above-described effect of the light guiding by of HOEs to generate the photogrammetric image RB of the object O. Instead of only one coupling region E1, however, the camera apparatus K has three coupling regions for recording the object O from different perspectives, namely the first coupling region E1, the second coupling region E2, and the third coupling region E3. The three coupling regions E1, E2, E3 thus represent the different acquisition regions of the camera apparatus K. The different coupling regions E1, E2, E3 are formed as separate HOEs H1, H2, H3 in FIG. 1 and applied at different positions of the carrier medium T. The carrier medium T can be formed, for example, as a windowpane in a motor vehicle.

To enable light guiding of the light acquired from the object O to the image acquisition device B, each of the coupling regions E1, E2, E3 has a respective deflection structure A1, A2, A3. The respective deflection structures A1, A2, A3 may, as depicted in FIG. 3, be incorporated as optical gratings, in particular as volume holographic gratings into a substrate, whereby the respective HOE H1, H2, H3 is formed. In the respective deflection structure A1, A2, A3, each of the coupling regions E1, E2, E3 can now deflect the light which is incident from the object O on the respective coupling region E1, E2, E3 and thus couple it into the carrier medium T. As already mentioned, the carrier medium T is formed as a light guide and can thus relay the light by internal reflection to a decoupling region A and thus to the image acquisition device B.

The decoupling region is also formed as an HOE, H4, and also has an optical grating as a deflection structure A4, by which the light transmitted by the carrier medium T from the coupling regions E1, E2, E3 and incident on the decoupling region A is decoupled from the carrier medium T. The deflection structure A4 of the decoupling region A may also be formed as a volume holographic grating.

To acquire the light decoupled from the deflection structure A, the image acquisition device B directly abuts the decoupling region A. In particular, the image acquisition device B directly abuts the decoupling region A with its light incidence region. An area of the light incidence region of the image acquisition device B is in particular precisely the same size as an area of the decoupling region A, wherein the light incidence region and the decoupling region are arranged completely overlapping.

Such an image acquisition device B generally has an imaging optical unit in the form of an objective, which images light incident via the light incidence region in the imaging optical unit on an image sensor SB. The image sensor SB converts the incident light into electrical signals which can subsequently be read out by an evaluation device of the image acquisition device B. An entirety of the electrical signals of an image sensor SB can also be referred to as image data or individual image data B1, B2, B3. The image acquisition device B is thus designed to acquire the decoupled light of the decoupling region A and to generate the individual image data B1, B2, B3 therefrom. As shown in FIG. 2, upon reconstruction to form a respective image or individual image, the individual image data B1, B2, B2 show the object O, recorded from different perspectives via the respective coupling region E1, E2, E3. In combination, the individual image data B1, B2, B3, when brought together to form a common image data set, then result in the spatially representative image data. The spatially representative image data thus represent a common image of the superimposed individual images, namely the photogrammetric image RB of the object O.

To now be able to form the photogrammetric image RB from the different image data or individual image data B1, B2, B3 which are generated from the incident light of the different coupling regions E1, E2, E3, it is advantageous if the image acquisition device B, in particular the image sensor SB, can separately acquire the light incident on the different coupling regions E1, E2, E3. For this purpose, the camera apparatus K in FIG. 1 has the separating device D. The separating device is used here to separate the light incident on the different coupling regions E1, E2, E3. If the separating device D were not present, the light from the environment would be transmitted simultaneously from all three coupling regions E1, E2, E3 to the image sensor SB. The transmitted light of the different coupling regions E1, E2, E3 would be superimposed so that in particular upon incidence of the superimposed light on the image sensor SB, an intensity superposition of the light would occur. To avoid this, the separating device D is provided. The separating device is designed as a frequency-selective separating device D in FIG. 1. It is thus used for the wavelength-dependent or color separation of the light transmitted via the different coupling regions E1, E2, E3. Alternatively to a frequency-selective separation, a chronological separation of the light transmitted via the different coupling regions E1, E2, E3 can also be provided.

To implement the frequency-selective separating device D, two filter systems are necessary as shown in FIG. 1. The first filter system relates to a design of the different coupling regions E1, E2, E3 and in particular here to a structure of the respective deflection structures A1, A2, A3. In contrast, the second filter system relates to a design of the image sensor SB. The frequency-selective separating device D in FIG. 1 is thus formed by the respective deflection structures A1, A2, A3 of the coupling regions E1, E2, E3 and by a filter element F connected upstream of the image sensor SB.

In the design of the camera apparatus K in FIG. 1, the respective deflection structures A1, A2, A3 are themselves made frequency-selective. That is to say, each of the deflection structures A1, A2, A3 only deflects light of a predetermined wavelength. The wavelengths which the different deflection structures A1, A2, A3 deflect differ in particular from one another. For example, the first deflection structure A1 can only deflect light of a first wavelength, for example red light, the second deflection structure A2 can only deflect light of a second wavelength, for example blue light, and the third deflection structure A3 can only deflect light of a third wavelength, for example green light. The deflection structures A1, A2, A3 are thus used as a color filter for the light incident on the respective coupling regions E1, E2, E3 from the environment. Therefore, for example, only red light of a specific wavelength is coupled from the environment into the carrier medium T by the first deflection structure, only blue light of a predetermined wavelength is coupled from the environment into the carrier medium T by the second deflection structure, and only green light of a specific wavelength is coupled from the environment into the carrier medium T by the third deflection structure A3. The respective coupling filters E1, E2, E3 are therefore used as a preliminary filter for the light incident on the coupling regions E1, E2, E3 from the environment. In contrast thereto, the decoupling deflection structure A4 of the decoupling region A can deflect light independently of the wavelength. It can thus be ensured that the transmitted light of the coupling regions E1, E2, E3 is actually decoupled from the carrier medium T. The decoupling region A, thus the decoupling HOE H4 can be formed in particular as a multiplexed volume hologram for this purpose. That is to say, the optical grating by which the decoupling deflection structure A4 is formed can have, for example, multiple grating planes. The grating planes can each have a different grating structure, wherein each of the grating structures diffract light of a different wavelength. Therefore, overall (poly-)chromatic light can be deflected by the decoupling region A, in particular in the light spectrum perceptible to humans.

In order that the image acquisition device B can distinguish the light transmitted by the decoupling regions E1, E2, E3 upon simultaneous incidence on the image sensor SB and thus can infer the perspective from which the object O was recorded, the color filter F is connected upstream of the image sensor SB. The color filter F can be designed, for example, as a Bayer filter, in which a color sensor element SE of the filter F is assigned to or connected upstream of each pixel P of the image sensor SB. Each color sensor element SE is used as a filter for light of a predetermined wavelength. In a Bayer filter, the sensor elements SE are generally formed in a repeating 4×4 matrix made up of two green color sensor elements G, one red color sensor element R, and one blue color sensor element B. The green color sensor elements G are only transmissive for green light of a specific wavelength, the red color sensor element R is only transmissive for red light of a specific wavelength, and the blue color sensor element B is only transmissive for blue light of a specific wavelength. The enlargement Z of the image acquisition device B in FIG. 1 shows the image sensor SB having the upstream color filter F. Alternatively to the design of the color filter F as a Bayer filter shown in FIG. 1, another color filter F can also be formed, for example, a Foveon X3 filter or X-trans filter.

The filter wavelength, thus a respective wavelength in relation to which the respective sensor element SE is transmissive, may correspond to the corresponding wavelength which is deflected by the respective deflection structure A1, A2, A3. That is to say, the first deflection structure A1 deflects, for example, only red light of a specific wavelength and the red sensor element R is only transmissive for this red light having the specific wavelength. Correspondingly, the second deflection structure A2 only deflects, for example, blue light of a specific wavelength and the blue sensor element B is only transmissive for this blue light having the specific wavelength. The third deflection structure A3 can also only deflect green light of a specific wavelength and the green sensor element G is only transmissive for this green light having the specific wavelength.

Due to the two color systems, namely the design of the deflection structures A1, A2, A3 and the color filter F, the light which is transmitted by the respective different coupling regions E1, E2, E3 can be transmitted separated by color to the image acquisition device B and nonetheless can be acquired simultaneously by the image acquisition device B, in particular the image sensor SB of the image acquisition device B. As shown in FIG. 2, different image data B1, B2, B3, which correspond to the incident light on the coupling regions E1, E2, E3, can thus be generated by the frequency-selective separating device D. The different image data or individual image data B1, B2, B3 can subsequently be superimposed by the image acquisition device B and reconstructed to form the photogrammetric image RB of the object O in the environment. The image acquisition device B is thus designed for photogrammetric acquisition and evaluation of the environment.

The reconstruction of the individual image data B1, B2, B3 to form the spatially representative image data represented by the one photogrammetric or three-dimensional image RB of the object O is described by way of example in FIG. 2. However, as mentioned above, a reconstruction to form spatially representative image data by which a stereoscopic image of the object O is provided is also possible.

Such a camera apparatus K can be used here, for example, for the interior acquisition of a motor vehicle. A windowpane of the motor vehicle can be used as the carrier medium T. An interior of the motor vehicle can thus be acquired and evaluated using the camera apparatus K. The camera apparatus K can thus be used, for example, to acquire gestures of an occupant of the motor vehicle. The HOEs H1, H2, H3, by which the coupling regions E1, E2, E3 are provided, may be transparent. They can thus be arranged in a visible region, namely, for example, in the middle on a windshield of the motor vehicle, without interfering with or obstructing a field of view of an occupant. A nontransparent part of the camera apparatus K, namely the part which includes the image acquisition device B, can be installed in particular in a paneling of the motor vehicle, for example in a doorframe.

Overall, the examples show how an environment can be generated photogrammetrically or stereoscopically in particular via an image sensor and multiple holographic optical elements (HOE).

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A camera apparatus for generating spatially representative image data of an environment, comprising:
    a carrier medium providing a light guide and having at least two coupling regions and a decoupling region, each coupling region having a coupling deflection structure, formed by one of a surface holographic grating and a volume holographic grating, to couple light, incident thereon separately from the environment into the carrier medium, the carrier medium configured to transmit the light coupled in via the at least two coupling regions by internal reflection to the decoupling region, and the decoupling region having a decoupling deflection structure configured to decouple the light, incident on the decoupling region, out of the carrier medium;
    an image acquisition device abutting the decoupling region, configured to acquire the light decoupled from the carrier medium and to generate therefrom respective image data, respectively correlated with the light of the environment incident on each of the at least two coupling regions and to generate the spatially representative image data from the respective image data; and
    a separating device comprising a switchable darkening layer and configured to separate the light incident on the at least two coupling regions based on a switching signal of the switchable darkening layer, so that the image acquisition device separately acquires the light incident on the at least two coupling regions.

2. The camera apparatus as claimed in claim 1, wherein the image acquisition device includes an image sensor configured to receive the light incident on the at least two coupling regions as one of superimposed and in succession.

3. A camera apparatus for generating spatially representative image data of an environment, comprising:
    a carrier medium providing a light guide and having at least two coupling regions and a decoupling region, each coupling region having a coupling deflection structure, formed by one of a surface holographic grating and a volume holographic grating, to couple light, incident thereon separately from the environment into the carrier medium, the carrier medium configured to transmit the light coupled in via the at least two coupling regions by internal reflection to the decoupling region, and the decoupling region having a decoupling deflection structure configured to decouple the light, incident on the decoupling region, out of the carrier medium;
    an image acquisition device abutting the decoupling region, configured to acquire the light decoupled from the carrier medium and to generate therefrom respective image data, respectively correlated with the light of the environment incident on each of the at least two coupling regions and to generate the spatially representative image data from the respective image data; and
    a separating device configured to separate the light incident on the at least two coupling regions, so that the image acquisition device separately acquires the light incident on the at least two coupling regions,
    wherein the image acquisition device includes an image sensor configured to receive the light incident on the at least two coupling regions as one of superimposed and in succession,
    wherein the separating device is configured to separate the light incident on the at least two coupling regions in a frequency-selective manner, and
    wherein the image sensor is a color image sensor.

4. The camera apparatus as claimed in claim 3, wherein the coupling deflection structure of each of the at least two coupling regions is frequency-selective, and deflects light of a respective predetermined wavelength different in each of the coupling deflection structures.

5. The camera apparatus as claimed in claim 4, wherein the respective predetermined wavelength of each of the at least two coupling regions corresponds to a respective color filter wavelength of the color image sensor.

6. The camera apparatus as claimed in claim 5, wherein at least three coupling regions are provided.

7. The camera apparatus as claimed in claim 4, wherein at least three coupling regions are provided.

8. The camera apparatus as claimed in claim 3, wherein a respective predetermined wavelength of each of the at least two coupling regions corresponds to a respective color filter wavelength of the color image sensor.

9. The camera apparatus as claimed in claim 8, wherein at least three coupling regions are provided.

10. The camera apparatus as claimed in claim 2, wherein the separating device is configured to separate the light incident on the at least two coupling regions chronologically.

11. The camera apparatus as claimed in claim 10,
    wherein the at least two coupling regions are switchable, and
    wherein the separating device separately switches a deflection characteristic of the at least two coupling regions.

12. A camera apparatus for generating spatially representative image data of an environment, comprising:
    a carrier medium providing a light guide and having at least two coupling regions and a decoupling region, each coupling region having a coupling deflection structure, formed by one of a surface holographic grating and a volume holographic grating, to couple light, incident thereon separately from the environment into the carrier medium, the carrier medium configured to transmit the light coupled in via the at least two coupling regions by internal reflection to the decoupling region, and the decoupling region having a decoupling deflection structure configured to decouple the light, incident on the decoupling region, out of the carrier medium;
    an image acquisition device abutting the decoupling region, configured to acquire the light decoupled from the carrier medium and to generate therefrom respective image data, respectively correlated with the light of the environment incident on each of the at least two coupling regions and to generate the spatially representative image data from the respective image data; and
    a separating device configured to separate the light incident on the at least two coupling regions, so that the image acquisition device separately acquires the light incident on the at least two coupling regions,
    wherein the image acquisition device includes an image sensor configured to receive the light incident on the at least two coupling regions as one of superimposed and in succession, wherein the separating device is configured to separate the light incident on the at least two coupling regions chronologically, wherein the at least two coupling regions are switchable, wherein the separating device separately switches a deflection characteristic of the at least two coupling regions, and wherein the separating device includes a switchable darkening layer switchable chronologically in dependence on a switching state.

13. The camera apparatus as claimed in claim 12, wherein at least three coupling regions are provided.

14. The camera apparatus as claimed in claim 10, wherein the separating device includes a switchable darkening layer switchable chronologically in dependence on a switching state.

15. The camera apparatus as claimed in claim 1, wherein the separating device is configured to separate the light incident on the at least two coupling regions chronologically.

16. The camera apparatus as claimed in claim 15, wherein the at least two coupling regions are switchable, and wherein the separating device separately switches a deflection characteristic of the at least two coupling regions.

17. The camera apparatus as claimed in claim 16, wherein the separating device includes the switchable darkening layer switchable chronologically in dependence on a switching state.

18. The camera apparatus as claimed in claim 17, wherein at least three coupling regions are provided.

19. The camera apparatus as claimed in claim 15, wherein the separating device includes the switchable darkening layer switchable chronologically in dependence on a switching state.

20. The camera apparatus as claimed in claim 19, wherein at least three coupling regions are provided.

* * * * *